(12) United States Patent
Daley et al.

(10) Patent No.: US 9,799,238 B2
(45) Date of Patent: Oct. 24, 2017

(54) DIGITALLY PRINTED HEAT TRANSFER LABEL

(71) Applicant: Avery Dennison Retail Information Services, LLC, Mentor, OH (US)

(72) Inventors: Joseph M Daley, Johns Island, SC (US); Robert Starling, Rock Hill, SC (US); Osman N. Tanrikulu, Denver, NC (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/728,242

(22) Filed: Jun. 2, 2015

(65) Prior Publication Data

US 2016/0358519 A1  Dec. 8, 2016

(51) Int. Cl.

| | |
|---|---|
| *B41M 3/12* | (2006.01) |
| *G09F 3/10* | (2006.01) |
| *C09D 201/00* | (2006.01) |
| *C09J 201/00* | (2006.01) |
| *C09J 7/02* | (2006.01) |
| *B41M 5/025* | (2006.01) |
| *B44C 1/17* | (2006.01) |
| *D06Q 1/12* | (2006.01) |
| *G09F 3/02* | (2006.01) |
| *G09F 3/00* | (2006.01) |

(52) U.S. Cl.
CPC .................. *G09F 3/10* (2013.01); *B41M 3/12* (2013.01); *B41M 5/025* (2013.01); *B44C 1/1712* (2013.01); *C09D 201/00* (2013.01); *C09J 7/0225* (2013.01); *C09J 201/00* (2013.01); *D06Q 1/12* (2013.01); *C09J 2400/22* (2013.01); *C09J 2400/225* (2013.01); *G09F 3/0291* (2013.01); *G09F 2003/023* (2013.01); *G09F 2003/0211* (2013.01); *G09F 2003/0257* (2013.01); *G09F 2003/0282* (2013.01)

(58) Field of Classification Search
CPC .................. B41M 3/12; B41M 5/0256; D06P 5/00–5/009
USPC ................................ 428/32.79, 32.77–32.81
See application file for complete search history.

(56) References Cited

U.S. PATENT DOCUMENTS

| | | |
|---|---|---|
| 5,667,614 A | 9/1997 | Stahl |
| 5,856,001 A | 1/1999 | Okumura et al. |
| (Continued) | | |

FOREIGN PATENT DOCUMENTS

EP       0492258       7/1992

OTHER PUBLICATIONS

International Search Report and Written Opinion dated Aug. 26, 2016 for International Application No. PCT/US2016/035447 filed Jun. 2, 2016.

(Continued)

*Primary Examiner* — Bruce H Hess
(74) *Attorney, Agent, or Firm* — Avery Dennison Retail Information Services, LLC

(57) ABSTRACT

A digitally printed heat transfer label and method of manufacture is disclosed. The heat transfer label and method of manufacture provides a more efficient process with less waste, as well as prevents halos. The method comprises adding adhesive powder to a digital image printed on a substrate to produce a high stretch, multi-color photographic quality label for the apparel industry.

18 Claims, 2 Drawing Sheets

(56) References Cited

U.S. PATENT DOCUMENTS

| | | | |
|---|---|---|---|
| 6,592,970 B2 | 7/2003 | Ohta et al. | |
| 7,402,223 B2 | 7/2008 | Marks, III et al. | |
| 9,290,038 B2* | 3/2016 | Colella | B44C 1/1712 |
| 2003/0091799 A1 | 5/2003 | Franke | |
| 2003/0135938 A1 | 7/2003 | Tyler et al. | |
| 2006/0251831 A1 | 11/2006 | Nishikawa et al. | |
| 2011/0079651 A1* | 4/2011 | Tsai | B32B 27/00 235/492 |
| 2014/0356592 A1 | 12/2014 | Colella | |

OTHER PUBLICATIONS

Calvert, Paul, "Ink Jet Printing for Materials and Devices", University of Arizona, Published Jun. 12, 2001, pp. 3299-3305.

\* cited by examiner

DIGITALLY PRINTED HEAT TRANSFER LABEL

BACKGROUND

The present invention relates generally to a digitally printed heat transfer label. The present subject matter is especially suitable for labeling fabrics. In accordance with embodiments of the present subject matter, digitally printed heat transfer labels for clothing and other articles are provided. Particular relevance is found in connection with the method of making the digitally printed heat transfer labels that streamlines the prior art complex process and achieves improved aesthetics and less waste. Accordingly, the present specification makes specific reference thereto. However, it is to be appreciated that aspects of the present inventive subject matter are also equally amenable to other like applications.

Printed labels are well-known and commonly used to transfer a graphic, such as text or a figure, onto an item, such as apparel or merchandise. A label is usually pre-printed with a graphic, and then the graphic is transferred from the label to the item using a heated pad or iron or the like. Printing techniques such as gravure printing, offset printing, flexographic printing, screen printing and digital printing all can be used to create a heat transfer label. Typically, the graphic is formed on a web or substrate onto which a release layer is applied. The ink graphic is applied to the release layer, followed by an adhesive. Thus, the adhesive is applied to the top surface of the graphic. When a user then applies the graphic to the item, the label is turned adhesive-side down onto the item and heat is applied to the back of the label substrate to transfer the graphic to the item from the release layer of the label substrate.

This composition of ink and adhesive is not efficient, as each layer of the graphic must be mixed and applied separately. The ink and the adhesive cannot be mixed together and applied in one stroke as the ink and the adhesive need to maintain different chemical characteristics. For example, labels on garments must be stretchable, water wash resistant, and chemical dry-cleaning resistant. For these reasons, the ink used in the graphic must be cross-linked to form a 3-dimensional network. Whereas, the adhesive cannot be cross-linked. The adhesive must be capable of being thermally activated and heat sealable in order for the user to transfer the graphic from the label to the garment. Thus, the ink and adhesive cannot be combined in one mixing pot as the mixture may result in the adhesive losing its thermoplastic characteristics. Further, the resulting graphic and adhesive layer can result in a halo around the graphic portion of the label, which can be aesthetically undesirable.

The present invention discloses a digitally printed heat transfer label and method of manufacture that provides a more efficient process with less waste, as well as prevents halos. The method would replace the multistep process, using a sheet or roll-fed process. Specifically, the method comprises adding adhesive powder to a digital image printed on a substrate to produce a high stretch, multi-color photographic quality label for the apparel industry.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a digitally printed heat transfer label and method of manufacture. The method comprises applying a release coating to a carrier or substrate, printing the image, applying a polymeric coating over the image, applying adhesive powders, drying the liquid, and cooling the resulting images.

In a preferred embodiment, the image is printed by a digital printer, then the polymeric coating is printed or applied over the digital image. While the polymeric coating is still wet, polymeric adhesive powders are applied. The coatings are then dried either via infrared (IR) lamps or air impingement dryers or oven. The adhesive powder should be melted or at least partially melted at this time, then the resulting images are cooled to set the images for the label.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
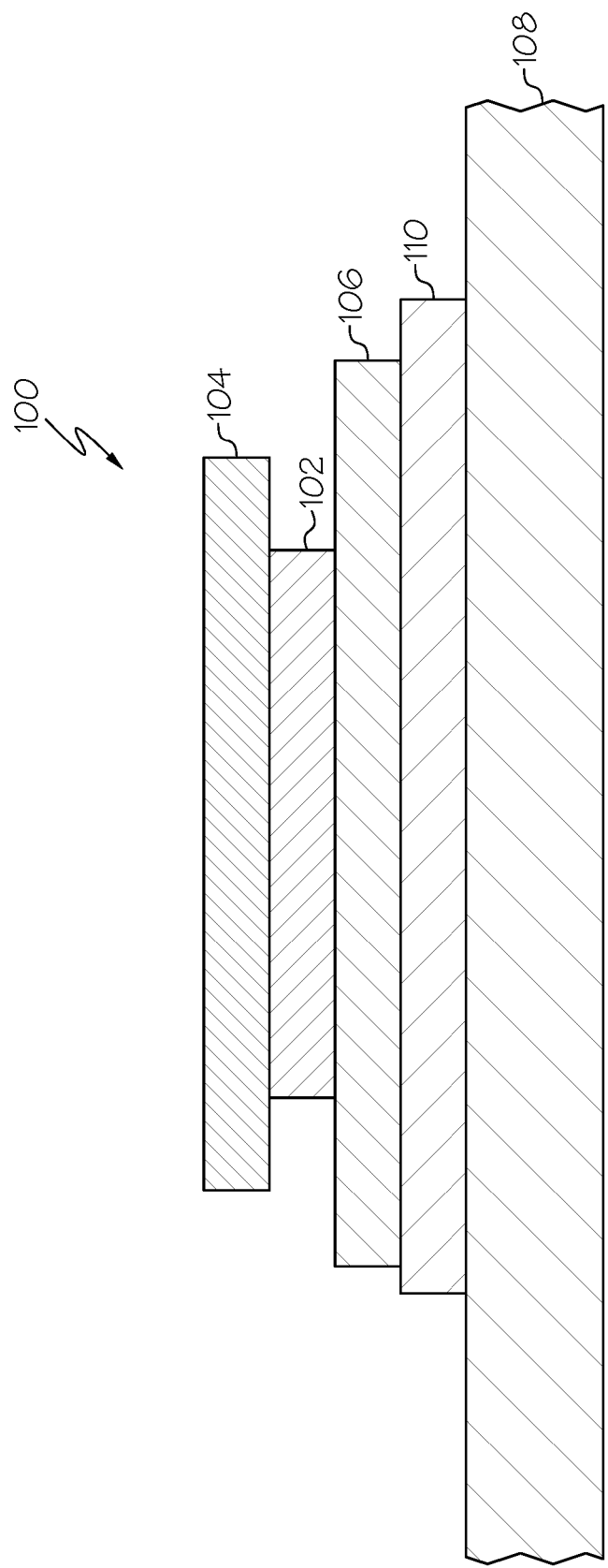
FIG. 1 illustrates a schematic cross-sectional view of an exemplary digitally printed heat transfer label in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

A digitally printed heat transfer label and method of manufacture is disclosed. The heat transfer label and method of manufacture provides a more efficient process with less waste, as well as prevents halos. The method would replace the multistep process, using a sheet or roll-fed process. Specifically, the method comprises adding adhesive powder to a digital image printed on a substrate to produce a high stretch, multi-color photographic quality label for the apparel industry.

Referring initially to the drawings, FIG. 1 illustrates a digitally printed heat transfer label 100. The heat transfer label 100 generally comprises one or more printed images 102 configured to define one or more graphics and/or text, and a polymeric coating or layer 104 overlying the printed images 102. An adhesive coating or layer 106 is then applied to the printed images 102. The heat transfer label 100 also generally comprises a carrier or substrate 108 and a release coating or layer 110.

The carrier 108 generally comprises a base material on which the remaining layers of the heat transfer label 100 are supported. However, although some layers or components of the heat transfer label 100 are described as "overlying" or being "on" other layers or components, it will be appreciated that the heat transfer label 100 may be inverted, such that different layers or components may be said to "overlie" or be "on" others. Accordingly, such terminology is provided merely for convenience of explanation and not limitation in any manner.

As stated supra, the heat transfer label 100 is applied to a base material. The base material is typically a non-woven fabric material, but can be any suitable material as is known in the art. The base material is typically produced using routine methods known in the art. Further, the base material would typically be part of (incorporated into) a clothing article or apparel, such as a t-shirt, jersey, sweatshirt, etc., or any other suitable clothing article as is known in the art. The heat transfer label 100 would be applied to the front side or the back side of the clothing article, or even on a tag of the clothing article depending on the wants and/or needs of the manufacturer or user.

When the heat transfer label 100 is joined to a clothing article or apparel, the adhesive coating or layer 106 generally contacts (i.e., is directly adjacent to) the exterior surface of the clothing article or apparel. The polymeric coating or layer 104 (and/or any residual release layer material) defines an outermost layer for the heat transfer label 100 on the clothing article or apparel that serves to protect the printed images 102 from damage.

The polymeric coating 104 and/or printed image 102 may comprise any suitable material that is capable of achieving the desired degree of flexibility and extensibility for a particular decorating (i.e., labeling) application. More particularly, at least a portion of the polymeric coating 104 and/or printed image 102 ideally stretches (i.e., extends or elongates) at least about 5%, more specifically, from about _% to about _%, in at least one direction without substantially cracking, speckling, distorting, or forming any other substantial defect in the heat transfer label 100 when the label is applied to the clothing article.

If desired, the polymeric coating 104 and/or printed image 102 may be formed from a curable composition or system, for example, an energy curable composition or system, such as printing the image with ultraviolet-curable inks to provide a label 100 that includes optically readable information, has excellent durability against wind, rain, and light, and can be produced more simply and at low cost. Other suitable inks can be used for printing the image 102 as is known in the art, as long as the inks provide visually recognizable information and durability against adverse conditions. Furthermore, the images are typically printed with a digital printer, or offset presses, such as Indigo® available from HP of Palo Alto, Calif. Images can also be produced using conventional flexographic or gravure printing equipment.

Furthermore, the adhesive coating or layer 106 is typically a powder coating, such as a powder adhesive that is applied over the last wet ink pass of the printed image 102. The powder coated surface is then brushed to remove the powder adhesive that did not stick to the wet ink. Subsequently, the powder adhesive coated label is heated to melt and distribute the adhesive. Thus, in theory, only the adhesive particles that are adhered to the wet ink remain on the label, and thus, no adhesive "halo" will be created with this method. Typically, the adhesive particles are heated or dried using IR lamps or air impingement dryers or oven, or any other suitable drying apparatus as is known in the art. The resulting images are then cooled to set the label 100.

Then, the heat transfer label 100 is placed on a substrate 108, for example, a shirt fabric, such that the adhesive layer 106 faces the substrate 108. To transfer the label 100, heat and pressure are applied over the substrate 108 with a label applicator. When heat and pressure are applied, the adhesive layer 106 softens and adheres to the substrate 108 permanently. The release coating/layer 110 is peeled off, and since the adhesion strength between the printed image 102 and the adhesive layer 106 is greater than that between the printed image 102 and the release coating/layer 110, the printed image 102 remains attached to the adhesive layer 106, and transfers to the substrate 108.

Figure 2:
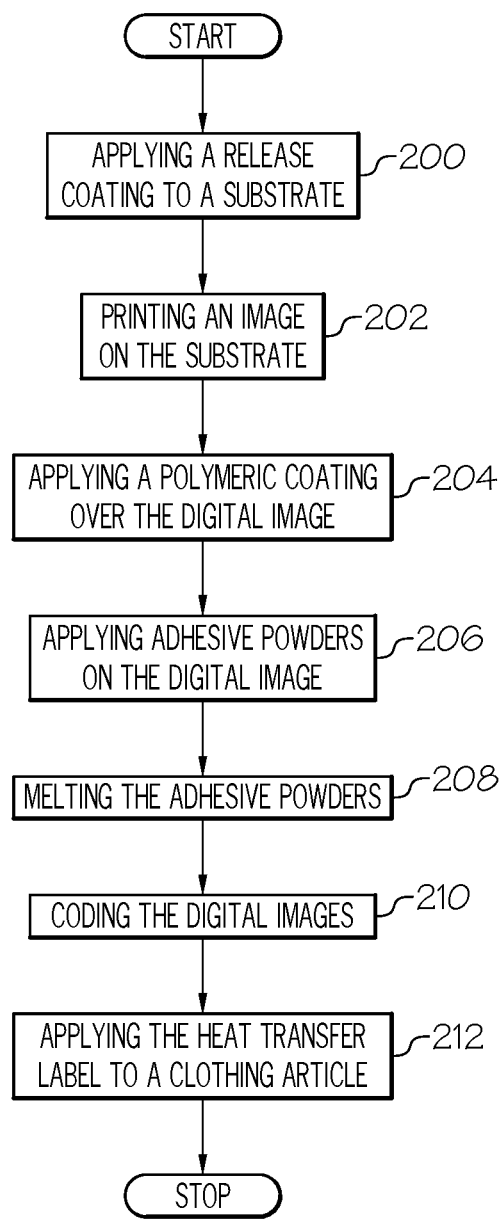
FIG. 2 illustrates a flowchart of manufacturing the digitally printed heat transfer label in accordance with the disclosed architecture.

As illustrated in FIG. 2, a method of manufacturing the digitally printed heat transfer label is shown. At 200, a release coating is applied to a carrier/substrate in either roll or sheet form. At 202, an image is printed onto the substrate via a digital printer or other suitable printer. At 204, a polymeric coating is applied over the digital image. At 206, while the coating is still wet, polymeric adhesive powders are applied to the digital image. At 208, the adhesive powders are dried or melted (or at least partially melted) using infrared (IR) lamps or air impingement dryers or oven, or any other suitable drying apparatus. Then, at 210, the resulting images are cooled to set the labels, which completes preparation of the heat transfer label. Transfer sheets and/or paper backing can be included to aid in the movement of the heat transfer label from the manufacturing point to the assembly or application area.

A heat transfer application stage occurs at 212. The digitally printed heat transfer label is applied to a clothing article or apparel, which falls in the category of soft goods such as products made from fabric or other pliable or bendable material. Examples include clothing of any type such as shirts, jerseys, and sweatshirts, as well as other products such as banners, flags, covers, bedding, throws and other soft goods. Transfers can be according to cut singles or roll-to-roll formats. Application equipment at this stage or phase can include heat transfer press machines, for example an Avery Dennison CTB-5 Heat Transfer Bonder. Digital or laser transfer approaches and equipment may be suitable for some products.

Thus, the present invention discloses a digitally printed heat transfer label and method of manufacture that provides a more efficient process with less waste, as well as prevents halos. The method would replace the multistep process, using a sheet or roll-fed process. Specifically, the method comprises adding adhesive powder to a digital image printed on a substrate to produce a high stretch, multi-color photographic quality label for the apparel industry.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A digitally printed heat transfer label for use on apparel, comprising:
    at least one printed image applied to a substrate layer;
    a polymeric coating, which can stretch at least about 5% and applied over the printed image; and
    an adhesive layer having a powder and applied over the polymeric coating layer and printed image, while the printed image is still wet.

2. The digitally printed heat transfer label of claim 1, further comprising a release layer applied to the substrate layer before the printed image is applied.

3. The digitally printed heat transfer label of claim 2, wherein the release layer is applied in roll form.

4. The digitally printed heat transfer label of claim 2, wherein the release layer is applied in sheet form.

5. The digitally printed heat transfer label of claim 1, wherein the printed image is printed on the substrate layer via a digital printer.

6. The digitally printed heat transfer label of claim 1, wherein the powder adhesive is then melted via an infrared (IR) lamp.

7. The digitally printed heat transfer label of claim 1, wherein the powder adhesive is then melted via an air impingement dryer.

8. The digitally printed heat transfer label of claim 1, wherein the powder adhesive is then melted via an oven.

9. A digitally printed heat transfer label for use on apparel, comprising:
    a release layer applied to a substrate layer;
    at least one digitally printed image applied to the release layer and the substrate layer;
    a polymeric coating, which can stretch at least about 5% and applied over the printed image; and
    an adhesive powder layer having a powder and applied over the polymeric coating layer and printed image, while printed image is still wet.

10. A method for manufacturing a digitally printed heat transfer label, comprising:
    a sheet or roll-fed process;
    applying a release coating to a substrate;
    printing an image on the substrate;
    applying a polymeric coating which can stretch at least about 5% over the image;
    applying polymeric adhesive powders to the polymeric coating;
    drying the polymeric coating; and
    cooling resulting images.

11. The method of claim 10, wherein the release coating is applied in roll form.

12. The method of claim 10, wherein the release coating is applied in sheet form.

13. The method of claim 10, wherein the image is printed via a digital printer.

14. The method of claim 13, wherein the polymeric coating is printed over the image.

15. The method of claim 10, wherein the polymeric adhesive powders are applied while the polymeric coating is still wet.

16. The method of claim 10, wherein the polymeric coating is dried via an IR lamp.

17. The method of claim 10, wherein the polymeric coating is dried via an air impingement dryer.

18. The method of claim 10, wherein the polymeric coating is dried via an oven.

* * * * *